United States Patent
Herzig (12)

(10) Patent No.: US 7,809,621 B2
(45) Date of Patent: Oct. 5, 2010

(54) ON-PREMISE RENEWABLE GENERATION SECURITIZATION

(76) Inventor: Michael Herzig, 2787 Route 9, Cold Spring, NY (US) 10516

(*) Notice: Subject to any disclaimer, the term of this patent is extended or adjusted under 35 U.S.C. 154(b) by 301 days.

(21) Appl. No.: 11/740,278

(22) Filed: Apr. 25, 2007

(65) Prior Publication Data
US 2008/0270276 A1    Oct. 30, 2008

(51) Int. Cl.
G06Q 40/00    (2006.01)
G06F 17/00    (2006.01)
(52) U.S. Cl. .......................... 705/35; 705/412
(58) Field of Classification Search ............... 705/26, 705/27, 412, 30, 34, 36 R, 37, 35, 38, 7, 10, 705/1.1, 29, 400
See application file for complete search history.

(56) References Cited

U.S. PATENT DOCUMENTS

| | | | |
|---|---|---|---|
| 6,311,137 B1 | 10/2001 | Kurokami et al. | |
| 7,133,787 B2 | 11/2006 | Mizumaki | |
| 2002/0033020 A1 | 3/2002 | Tonomura et al. | |
| 2004/0103056 A1* | 5/2004 | Ikeda et al. | 705/38 |
| 2004/0138977 A1* | 7/2004 | Tomkins et al. | 705/36 |
| 2004/0177027 A1* | 9/2004 | Adachi | 705/37 |
| 2006/0271214 A1 | 11/2006 | Brown | |
| 2007/0162367 A1* | 7/2007 | Smith et al. | 705/35 |
| 2007/0226163 A1* | 9/2007 | Robles | 706/50 |
| 2008/0091625 A1* | 4/2008 | Kremen | 705/412 |
| 2008/0172256 A1* | 7/2008 | Yekutiely | 705/4 |
| 2008/0215500 A1* | 9/2008 | De La Motte | 705/36 R |

OTHER PUBLICATIONS

Wang, Jianhui, The Application of Grey System Theory in Asset Securitizaton, 2007, pp. 1-3.*
Burger, Werner, Asset Securitisation, 2006, pp. 1-67.*

* cited by examiner

Primary Examiner—Igor Borissov
(74) Attorney, Agent, or Firm—Jennifer Meredith, Esq.; Meredith & Keyhani, PLLC

(57) ABSTRACT

A method of securitizing at least one on premises renewable power systems, the method comprising: providing at least one customer to provide a group of customers, wherein at least one customer has a on premises renewable power system and on premises renewable power system has associated on premises renewable power system characteristics and each customer has customer variables; providing a contractual relationship between each customer and a third party; determining the anticipated recurring fees for the group of customers according to the on premises renewable power system characteristics and customer variables; determining the anticipated monthly cash flow of group of customers according to the anticipated recurring fees; and securitizing the on premises renewable power system according to anticipated monthly cash flow and customer variables.

22 Claims, 3 Drawing Sheets

Securitization Logical Diagram

FIGURE 2

SECURITIZATION WORKSHEET

Directions: Based on the input variables, this worksheet will calculate the monthly cashflow and determine the value for which the systems can be securitized

Total Monthly Cash Flow

| | Amount |
|---|---|
| Ongoing Monthly Cashflow (156) | 4,990.00 |
| Limited Duration Monthly Cash Flow (158) | 5,833.33 |
| Total Amount possible to Securitize (160) | $525,916 |

INDIVIDUAL CUSTOMER RATING VARIABLES

| | Amount | Rating | Weight | TOTAL |
|---|---|---|---|---|
| Annual income (household) (162) | 85000 | 8 | 20% | 1.6 |
| Credit rating (164) | 720 | 9 | 15% | 1.35 |
| Years in current job/field (164) | 5 | 8 | 5% | 0.4 |
| Approximate net worth (thousands)(166) | 240 | 7 | 5% | 0.35 |
| Current usage power (168) | 50 | 8 | 20% | 1.6 |
| Amount of time in home (170) | 95% | 9 | 10% | 0.9 |
| History of moves to different homes (172) | 3 | 6 | 10% | 0.6 |
| Likelihood of moving in 2 years (174) | 20% | 5 | 15% | 0.75 |
| TOTAL CUSTOMER RATING | | 7.5 | 100% | 7.55 |

GUARANTEE FACTORS

| | % | Impact | TOTAL |
|---|---|---|---|
| Guarantee of the payments from one or more systems (176) | 5 | 1 | 0.5 |
| Guarantee of the payments for % of systems (178) | 10% | 1 | 1 |
| Guarantee to replace % of systems (180) | 5 | 2 | 1 |
| Average Guarantee Rating (182) | | | 2.5 |

FEE ASSESSMENT VARIABLES

| | Unit | Factor | Total Amount |
|---|---|---|---|
| Billing/Fee Period (100) | Month | | |
| Number of Systems Covered (102) | # | N/A | 100 |
| Average Anticipated Core Usage Fees (104) | $ | Ongoing | 40 |
| Average Anticipated Core Recurring Fees (106) | $ | N/A | N/A |
| Average Labor Fees (108) | $ | 12 | 600 |
| Average Financing Fees (120) | $ | 12 | 100 |
| Average Processing Fees (122) | $ | Ongoing | 3.95 |
| Average Minimum Fees (124) | $ | Ongoing | 10 |
| Average Maximum Fees (126) | $ | Ongoing | 50 |
| Average Maintenance Fees (128) | $ | Ongoing | 5.95 |
| Average Insurance Fees (130) | $ | N/A | N/A |
| Average Customer Rating (132) | # | N/A | 7.55 |
| Discount Rate (134) | % | 5% | |

ANTICIPATED RECURRING FEE CALCULATOR

| | |
|---|---|
| Determination of the fee period (e.g. monthly) (136) | Month |
| Compilation of periodic fees received to date/month (138) | 4000 |
| Anticipated monthly generation for the group (140) | N/A |
| Anticipated value/cost of each unit of generation (142) | N/A |
| Anticipated ongoing gross periodic fee receipts (144) | 4000 |
| Computation of any collection costs (146) | 200 |
| Compilation of the value of the underlying systems (148) | 200000 |
| Determination of the amortization period (150) | 5 years |
| Determination of Guarantees Required (1-10)(152) | 2.5 level |
| Compilation of installation and other costs (154) | 75000 |

Ongoing Cash Flows (184)

| YR | | |
|---|---|---|
| 1 | 59,880 | 70000 |
| 2 | 59,880 | |
| 3 | 59,880 | |
| 4 | 59,880 | |
| 5 | 59,880 | |
| 6 | 59,880 | |
| 7 | 59,880 | |
| 8 | 59,880 | |
| 9 | 59,880 | |
| 10 | 59,880 | |
| 11 | 59,880 | |
| 12 | 59,880 | |
| 13 | 59,880 | |
| 14 | 59,880 | |
| 15 | 59,880 | |
| 16 | 59,880 | |
| 17 | 59,880 | |
| 18 | 59,880 | |
| 19 | 59,880 | |
| 20 | 59,880 | | ic
ON-PREMISE RENEWABLE GENERATION SECURITIZATION

The present invention relates to systems and methods for securitizing at premises renewable power systems.

Currently there are many different approaches to generating renewable energy. These can be divided by technology and by scale. In terms of technology, the main types of renewable power systems are: Wind, Solar, Geothermal and Hydro. Of course, there are many variations within each area, such as the difference between photovoltaic solar panels and those that reflect the energy to generate power mechanically from heat (e.g. the Sterling generating system). In terms of scale, the main difference is between large power systems which are better suited to feeding into grids managed by utilities, and small systems which can provide the power exactly at the point of usage (e.g. at a home or small business). The advantage of the later type of systems is that they reduce the expense of transmission during which some power is lost and which also require ongoing maintenance. One disadvantage is the increased upfront costs associated with renewable power system. Accordingly, it would be desirable to provide methods of financing such systems to encourage their use, which would in turn benefit the environment.

Securitization is the process of taking any asset or group of assets which generate recurring revenues and converting them into a security, in many cases a debt instrument. A common example of securitization is the market for Mortgage Backed Securities where lenders package home loans into groups based on loan amount, credit worthiness, payment schedules (which may be variable), known default rates, etc. and then have investment banks resell these on the markets. Often, the Mortgage Backed Securities are grouped into interest only and principal only tranches, each of which has its own characteristics. The benefit of securitization from the lender's perspective is that it enables them to focus on their core function—determining credit risk and making loans—while giving them access to a much larger pool of capital. The process of securitization enables them to tap the entire capital markets, rather than rely only on their own deposits for making loans.

In much the same way that lenders benefit from securitization, an owner/manager of one or more renewable power generators that was able to group them and aggregate their recurring revenues would benefit from securitizing these systems. This would enables that owner to free up the capital invested in these assets, the renewable power systems, to invest in the deployment of additional systems, pay for operational expansion or otherwise beneficially use the capital. Essentially, this would make a very large pool of capital available for investment in renewable energy systems, similar to the effect of Mortgage Backed Securities on housing. It would enable a Third Party to continue to focus on its core competency of installing new renewable energy systems, while providing easier access overall to funds for renewable energy.

While any asset can be financed based on its intrinsic properties, the aggregation of assets along with select guarantees add important characteristics which make securitization both easier and more favorably priced. By demonstrating an expected cash flow based on historical data and offering coverage in case of a certain level of defaults, a company can convert a set of individually unpredictable assets into a very predictable stream of ongoing payments which can be securitized more efficiently. These components make securitization of a diverse and distributed set of assets uniform and feasible to securitize.

SUMMARY OF THE INVENTION

The present invention relates generally to systems and methods for securitizing on premises renewable power systems.

A method of securitizing at least one on premises renewable power systems, the method comprising: providing at least one customer to provide a group of customers, wherein each of the at least one customer has a on premises renewable power system and the on premises renewable power system has associated on premises renewable power system characteristics and each customer has customer variables; providing a contractual relationship between each customer and a third party; determining the anticipated recurring fees for the group of customers according to the on premises renewable power systems' characteristics and the customers' variables; determining the anticipated monthly cash flow of the group of customers according to said anticipated recurring fees; and securitizing the on premises renewable power system according to the anticipated monthly cash flow and the customer variables.

A method of securitizing at least one on premises renewable power systems, the method comprising: providing at least one customer to provide a group of customers, wherein each of the customers has a on premises renewable power system and the on premises renewable power system has associated on premises renewable power system characteristics and each customer has customer variables and the customer is billed by a third party according to energy usage; providing a contractual relationship between each customer and the third party; determining the fee assessment variables of the group of customers according to the on premises renewable power system characteristics and the customer variables; determining the anticipated recurring fees for the group of customers according to the on premises renewable power system characteristics and the customer variables; determining the anticipated monthly cash flow of the group of customers according to the anticipated recurring fees and the fee assessment variables; and securitizing the on premises renewable power system according to the anticipated monthly cash flow and customer variables.

These and other features, aspects and advantages of the present invention will become better understood with reference to the following description and claims.

BRIEF DESCRIPTION OF THE DRAWINGS

FIG. 2 depicts the present invention.

DETAILED DESCRIPTION OF THE INVENTION

Figure 1:
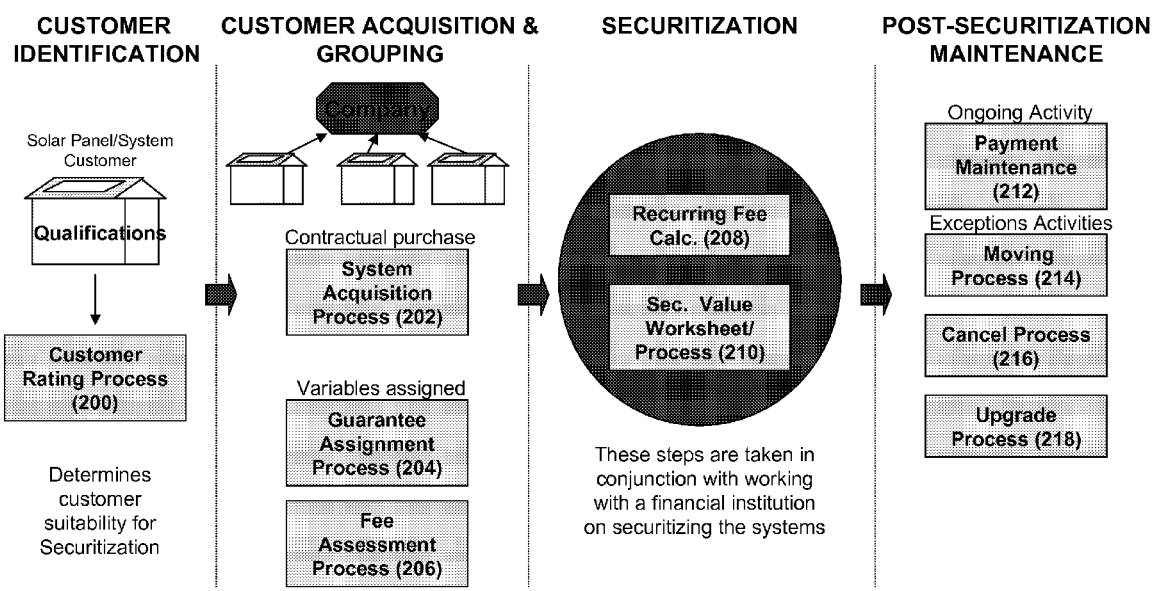
FIG. 1 depicts the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

For the purposes of this application, the term securitization refers to the process of creating a financial instrument by combining financial assets and then marketing them to investors. The present invention provides a method for the securitization of at-premises renewable power systems (solar, geothermal, biomass or wind) at one or more locations that generate power primarily for a home or a small business where they are located. The securitization is based on anticipated recurring revenues from these systems.

The term on premises renewable power system (10) is intended to include renewable energy systems including solar systems, solar panel systems, systems powered by solar panel systems and other on premises renewable power system, photovoltaic, thermal, wind powered to even local hydropower in some cases. Also, the terms at-premises, on premises and locally based are interchangeable and equivalent. Additionally, for those interested in heating and cooling their dwelling via renewable energy, geothermal heat pump systems that tap the constant temperature of the earth, which is around 7 to 15 degrees Celsius a few feet underground, are an option and save money over conventional natural gas and petroleum-fueled heat approaches. The term on premises renewable power system does not include conventional natural gas and petroleum fueled heat. The method for securitizing one or more at-premise renewable energy systems must acquire either ownership or else the rights to each particular renewable energy system. This may be done in one of four methods: lease, purchase, lease-back and maintenance agreement.

Purchase of the Renewable Energy System for or from the Customer is the most common process of acquiring the systems. In this case, the Third Party (e.g. a Company) would own and have responsibility for the renewable energy generating system, including all benefits of power generated as well as maintenance obligations. It is likely that the Third Party would not have ownership or obligations for some of the connecting pieces of the system (e.g. the in-house portion of wiring for a photovoltaic system or some of the pipes for a solar hot water system). The reason for this is that these become part of a premise's core infrastructure, while the power generating system is a more self contained unit. Likely specific steps to this process are as follows: (a) Determination by Customer of which system(s) will be installed at their premises; (b) Purchase of the system(s); (c) Installation of the system(s) at the premises; (d) If the Customer had made the initial purchase of the system to take advantage of government incentives, then the Third Party would re-purchase the system(s) from the Customer according to a pre-set price and servicing contract. In any case, the contract would include agreed to energy prices per unit, maintenance items, removal fees, termination conditions as well as upgrade rights. As noted, there may be government incentives for the purchase of certain energy efficient at premise renewable power systems. Because of this, it may be desirable for the Customer to purchase the system, obtain the incentives and then sell it to the Third Party. Alternatively, the incentives may be assigned to the Third Party. The Customer or the Third Party may either own the system outright or may attain rights to the system (e.g. lease as described below). In either case, the Customer gains access to the benefits of renewable power with much lower upfront capital costs.

Long-term Lease of the System from the Customer. This option takes place when the customer would prefer to maintain ownership of the system. It would most likely include an up front payment to the Customer for the Lease Rights as well as agreed-to conditions for ongoing fees, etc. Likely specific steps to this process are as follows: (a) Determination by Customer of which system(s) will be installed at their premises; (b) Purchase of the system(s); (c) Installation of the system(s) at the premises; (d) Lease of the system(s) from the Customer according to a pre-set price and servicing contract. This will include agreed to energy prices per unit, maintenance items, removal fees, termination conditions as well as upgrade rights Long-term Maintenance/service Agreement with the Customer. This would occur in situations where the Customer prefers to pay for and retain the value of the system hardware but would like a long-term maintenance and service agreement. The main difference between this arrangement and the prior two is that the Customer is unlikely to receive any significant up-front sum for the system(s), and ongoing payments are likely to be lower. Likely specific steps to this process are as follows: (a) Determination by Customer of which system(s) will be installed at their premises; (b) Purchase of the system(s) by the Customer; (c) Installation of the system(s) at the premises; (d) Agreement to a long-term maintenance agreement with the Customer. This will include agreed to energy prices per unit for servicing provided, maintenance items, termination of service conditions as well as upgrade rights With reference to FIGS. 1-2, the method may further comprise the step of determining the fee assessment variables of the group of customers according to the on premises renewable power system characteristics and the customer variables. The customer variables may be, for example, annual income (162), credit rating (164), years in current job (165), net worth (166), power usage (168), length in home (170), number of moves during a predetermined time period (172), likelihood of moving (174) and worthiness rating (175). It may be important to assess the likelihood of moving, because a move would bring risk into the equation, as the new owner may or may not be interested in the on premises power system. From this information, each Customer may be given a rating (200) from 1 to 10 (1 being the lowest and 10 being the highest) according to their likelihood to provide a consistent usage of the renewable energy system and therefore a consistent revenue stream. This then would translate into that Customer's suitability for securitizing an at-premises renewable power system (200). It is important to note that this does not rely on the same criteria that a normal home mortgage assessment would, since the customer would not be tied to the system in case of a move or low usage. The specific factors and weightings that go into the Customer Rating Process may be changed without departing from the present invention. Nonetheless, one key aspect of the process is to correlate as closely as possible the likelihood that the customer will continue to pay a non-volatile recurring revenue stream on his/her renewable energy system. This rating will then be used to anticipate the dependability of the recurring revenues from each system within the aggregated group, and thereby determine the number and amount of guarantees required to ensure the predictability of the revenue stream from an investor's perspective.

The fee assessment variables are selected from the group consisting of: number of on premises renewable power systems (102), anticipated core usage (104), actual core usage, anticipated recurring fees (106), actual recurring fees, labor fees (108), financing fees (120), processing fees (122), minimum fees (124), maximum fees (126), maintenance fees (128), insurance fees (130), customer rating (132), discount rate (134). This process covers the underlying assumptions as to how each Customer's fees will be fed into the Recurring Fee Calculator (discussed in the next step). This process assesses the following variables: (a) Core Usage Fees: These are the amounts charged per unit of energy that is generated by a particular renewable energy source that is then charged to the Customer. Types of Core Usage Fees may include the following: (i) Different cost tiers per Kilowatt Hour based on usage thresholds (generally set by the utility or State board); (ii) Different cost tiers per Thermal Unit based on usage thresholds; (b) Core Recurring Fees: These include any amount contractually agreed to with the Customer for usage of the system for energy generated when these are not based on usage; (c) Labor Fees: This includes any labor fees which may be associated with the installation or other services which are not related to energy generation. These may be charged for a fixed amount of time or until a certain amount is paid off by the Customer; (d) Financing Fees: These fees relate to interest costs if the Customer finances any amount with the Third Party. These fees may include both principal and interest or interest only; (e) Processing Fees: This relates to any fees the Third Party charges for ongoing processing of an account or Customer; (f) Minimum/Maximum Fees: These are thresholds which can be applied to the Core Energy or Recurring Fees in order to ensure that the amount charged stays within agreed boundaries and reflects the reality of how the system works. For example, with a solar hot water heater, a minimum may need to be charged each month in case the Customer is not at the premises and does not use hot water. This reflects the core cost of fuel in a traditional hot water heater to keep the water hot on an ongoing basis. Similarly, there will be a cap on Core Usage Fees each month to reflect an advantage of solar water heating's efficiency if used regularly; (g) Maintenance Fees: These are any fees charged to cover regular maintenance of the system; (h) Insurance Fees: These fees apply to insurance to cover any items not normally covered in the standard contract.

Software and/or business logic which calculates the anticipated recurring fees (206) from a group (defined as one or more) of renewable power generating systems that are located at homes or small businesses. This calculation is achieved through the input and computation of many variables, including but not limited to periodic fees, monthly generation for said group of customers, anticipated cost of each unit of generation, actual cost of each unit of generation, anticipated ongoing period fee receipts, actual ongoing periodic fee receipts, collection costs, value of said on premises renewable power systems, amortization period, guarantees, installation costs, miscellaneous costs. The recurring fees (208) may be calculated and the securitization value may be calculated (210).

The contractual relationship between the customer and the third party may be selected from the group consisting of lease, purchase, lease-back and maintenance agreement. Software and/or business logic which takes the Anticipated Recurring Fee for a group of power generating systems and combines these with a user selected amortization period into a worksheet which also contains the value of the underlying power generating systems, the anticipated volatility of the Anticipated Recurring Fees based on the Customer Rating Process, any Guarantees provided by the Third Party that is collecting the fees and managing the systems, etc. This Securitization Worksheet is then used to determine the amount that can be received based on these variables. The step of securitizing the on premises renewable power system according to anticipated monthly cash flow and customer variables may be comprised of the following steps: (a) Meet with financial institutions to review the Securitization Worksheet (which will contain all relevant information) and discuss options for securitizing each particular group of at-premise renewable energy generating systems; (b) Discuss the characteristics of the specific group of systems and determine the terms of securitizing; (c) Create a Securitization Agreement for the group of systems; (d) Complete the required documentation and receive the financing; (e) Make the regular payments to the financial institution according to the Agreement based on continuous activity and established relationships, improve the process of securitizing at-premise renewable energy generating systems.

The method may further comprise the steps of (204) assigning at least one guarantee to a group of customers. These Guarantees are important to determining the risk level of the group of systems to be securitized, and also are important in terms of their impact on the Third Party's overall risk and debt exposure. The types of Guarantees which can be made fit into one of the following categories: (a) Guarantee of the payments from one or more specific systems. In this area, the Third Party would make the payment for a certain set of systems if the Customers were unable to pay these; (b) Guarantee of the payments from up to a certain percentage of systems (e.g. up to 10% not paying). This would spread some of the risk for ensuring the Customer Rating Process is valid onto the Third Party; (c) Guarantee to replace up to a certain percent of non-paying customers with paying customers.

The customer may be billed by the third party according to energy usage. The customer may also be billed according to a predetermined monthly payment and would be allotted usage according to the predetermined monthly payment.

Because securitization is based on a recurring revenue stream, it is important that payments continue throughout the term of the securitized items/assets. However, for a renewable energy system that is either not owned or maintained by a Customer, there needs to be a process to handle the situation when the Customer leaves their premises or a moving process (214). The reason for this is that it may not be easy to require a Customer to transfer the renewable energy system relationship when that Customer sells their home or small business. For this reason, the following process may need to be established: (a) The Customer will have the right to terminate the agreement to purchase energy from the system when that Customer vacates their premises; (b) The Third Party will seek to create a new agreement with the new owner/tenant of the premises; (c) The Third Party needs reserves in the payment streams to cover the contingency of Customers moving. This should be covered based on the rating given in the Customer Rating Process; (d) These reserves will need to be sufficient to cover payments in the event a Customer leaves and there is a gap in payments or when the new owner/tenant does not want the system.

The process when a customer cancels (216) works similarly to the process When a Customer Moves (214) with a few important differences. The contract with the Customer will contain a removal clause that charges the Customer for this expense. This is intended to cover not only specific removal expenses, but also some of the other costs involved. This will include moneys for paying part of the ongoing cash flows. These should be sufficient to cover the recurring cash streams until either another system is added in its place, or reserves are used for the same purpose This process covers the specific steps of how the Customer uses the system on an ongoing basis. The Payment/Maintenance Process may include one or more of the following items: (a) the system may be connected to a billing usage system which measures usage of energy generation in real time to determine how much should be paid periodically; (b) an online interface may be utilized to process ongoing payments to the Third Party; (c) a telephone interface may be used to process ongoing payments to the Third Party; (d) credit card information may be stored at the Third Party which is billed regularly based on energy generation, usage or another variable; and (e) a prepaid arrangement may be a set amount of energy per year.

The process of upgrading (218) may also be required and included the terms of each securitization agreement. Essentially, it allows the Third Party to upgrade any particular renewable energy generating system in the group at a specific Customer's premise and have it take the place of the prior system so long as it operates as well or better than the replaced system was anticipated to operate. This is important in ensuring the Third Party is able to continue to respond to market trends in new renewable energy generating systems.

The method may further comprise the steps of: determining credit for each customer; Assigning credit to each customer; guaranteeing the system if the current owner leaves the house and a new owner moves in, or for a small business where the nature of the business changes and utilization changes; guaranteeing a percentage of the revenue of each customer by a third party company; customers may sign up for the system online; customers may maintain ownership of the system but let the Third Party purchase long term lease rights to it to put it in a securitized grouping; customers may pay their monthly payments through online billing; customers may utilize a website to maintain their accounts; the system may be updated within the grouping, so long as the Third Party guarantees the revenue range of the initial package.

Figure 3:
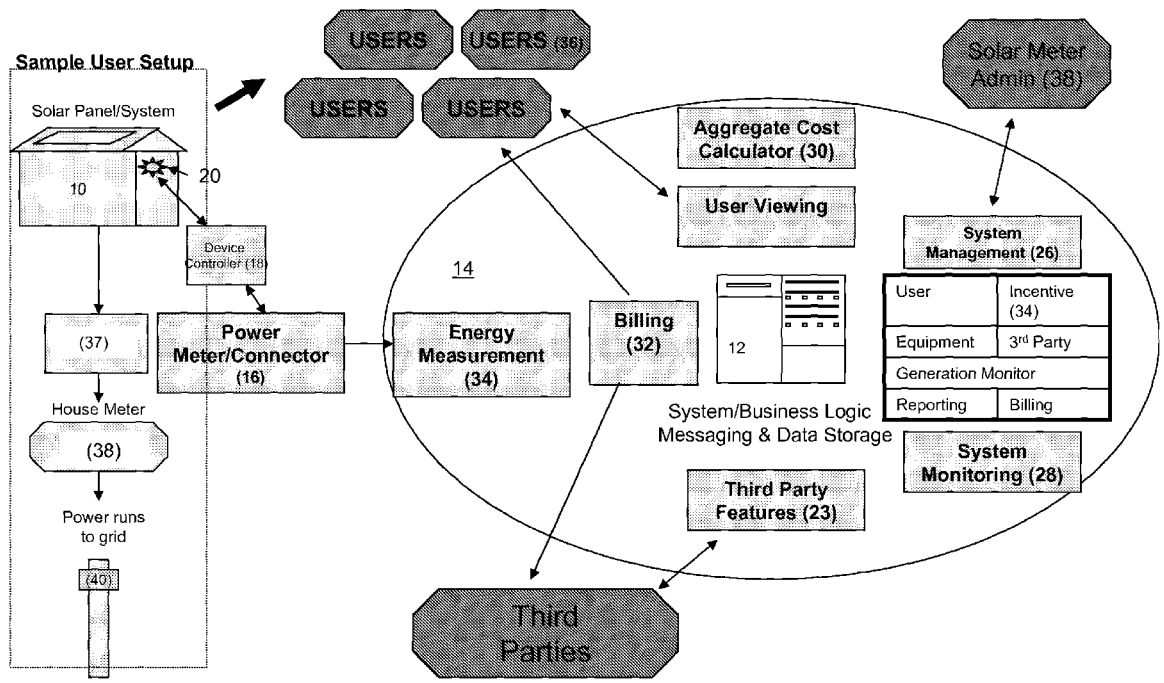
FIG. 3 depicts one possible embodiment of the present invention.

FIG. 3 depicts a system which the present invention may utilize for securitizing systems at a consumer's premises. It should be understood that FIG. 1 is only one possible embodiment and there could be many different embodiments. The terms locally based, at-premises and on premises are interchangeable. The system may comprise: at least one on premises renewable power system (10) at a consumer's location (11), wherein the at least one locally based renewable power system (10) has power system characteristics (e.g. equipment information) and available incentives and the locally based renewable power system characteristics and available incentives are stored in a database (12); a set of customer variables maintained in a database (12); a central processing unit (14) in communication with the database (12), wherein the central processing unit (14) may determine the aggregate cost of the at least one on premises renewable power system (10), a break even point of the at least one on premises renewable power system according to a discount rate and amortization period of the at least one on premises renewable power system (10) and may determine the securitization of a group of on premises renewable power system (10). It should be understood that there may be available incentives according to the on premises renewable power system, or the incentives may be equal to zero when there are no available incentives for the on premises renewable power system. The central processing unit (14) determines the consumer's monthly payment according to the consumer's customer variables, the break even point and the aggregate cost and provides billing to the consumer according to the consumer's monthly payment. The central processing unit (14) may also calculate the securitization value of a group of consumers' monthly payments. There may also be a communication means (16) in communication with the on premises renewable power system (10), the database (12) and the central processing unit (14). It should be understood, the database (12) may be in the central processing unit (14) or external and in communication without departing from the present invention. There may also be a power system device controller (18) in communication with the communication means (16). In this manner, the communication means (16) may direct a set of instructions from the database (12) and/or central processing unit (14) (such as temperatures in certain zones at certain times of the day or automatically shutting off lights (20) at certain times) to the power system device controller (18), which in turn adjusts power system devices (such as lights (20) and heating and cooling systems). The on premises renewable power system (10) may be owned by a third party owner (22) who may in turn lease it to the consumer. There may also be third party features (23), incentives (24), a system management module (26), a system monitoring module (28), an aggregate cost calculator (30), a billing module (32), an energy measurement module (34), users (36), solar meter (37) a house meter (38) and grid (40). Software/business logic which calculates periodic bills (e.g. monthly) for the electricity generated that can be sent to the consumer. This process may take into account: different energy rates based on consumption and renewable status, net metering, etc. The monitoring, billing and website (12) system may generate bills and reports (41) for consumers for their power used based on input cost thresholds and selected periods; determine aggregate billing for Third Parties (35); ability to create the billing (39) statements for the consumers (36); record the amount billed per period (information linked to a credit card merchant account); send email invoices to customers on their computer (100).

There may also be third party features (23), for example there may be software/business logic which allows a third party (35) to use the system to provide a white labeled service to their consumers (e.g. a local solar panel installer can offer this service through their site, and it will appear to the consumer to be that installer's brand with the bill coming from that Third Party). Specific features of this functionality are as follows: create a branded view which represents the Third Party's company; ability to create branded billing from the Third Parties; ability to allow the Third Party to adjust their information online; ability to have the Third Party site hosted at a separate URL; a home page for the Third Party users to see their consumers and the amount of energy generated may be on the internet (27); ability to view energy generated for the Third Party's consumers according to a variety of preset periods (e.g. today, month to date, year to date, etc); ability to view past and current billing for the Third Party's consumers (e.g. past months statements, year to date billing, net metering amounts, etc.).

The present invention provides a method of securitizing at least one on premises renewable power system (10), the method comprising: providing at least one customer (36) to provide a group of customers (37), wherein each customer (36) has a on premises renewable power system (10) and the on premises renewable power system (10) has associated on premises renewable power system characteristics and each customer has customer variables; providing a contractual relationship between each customer and a third party (41); determining the anticipated recurring fees for the group of customers (39) according to the on premises renewable power system characteristics (10) and the customer variables; determining the anticipated monthly cash flow of the group of customers according to the anticipated recurring fees; and securitizing the on premises renewable power system(s) (10) according to the anticipated monthly cash flow and the customer variables.

It should be understood that the foregoing relates to preferred embodiments of the invention and that modifications may be made without departing from the spirit and scope of the invention as set forth in the following claims.

I claim:

1. A computer implemented method of securitizing at least one on premises renewable power systems, said method comprising:

providing at least two customers to provide a group of customers, wherein each of said at least two customers has an on premises renewable power system in communication with a central processing unit and said on premises renewable power system has associated on premises renewable power system characteristics and each said customer has at least one customer variables;

providing a contractual relationship between each said customer and a third party, wherein said third party owns said on premises renewable power system;

rating each said customer according to said at least one customer variables to provide a customer rating;

determining dependability of anticipated revenue for each said at least one customer according to said customer rating;

determining anticipated recurring fees by said central processing unit for said group of customers according to said on premises renewable power system characteristics and said customer variables;

determining anticipated monthly cash flow by said central processing unit of said group of customers according to said anticipated recurring fees and said dependability of anticipated revenue for each said at least one customer; and securitizing said on premises renewable power system according to said anticipated monthly cash flow and said customer variables.

2. A method as in claim 1, further comprising the step of determining fee assessment variables of said group of customers according to said on premises renewable power system characteristics and said customer variables.

3. A method as in claim 1, wherein said customer variables are selected from the group consisting of annual income, credit rating, years in current job, net worth, power usage, length in home, number of moves during a predetermined time period, likelihood of moving and aggregate rating.

4. A method as in claim 2, wherein said fee assessment variables are selected from the group consisting of: power system characteristics, aggregate cost, break even point, number of on premises renewable power systems, anticipated core usage, actual core usage, anticipated recurring fees, actual recurring fees, labor fees, financing fees, processing fees, minimum fees, maximum fees, maintenance fees, insurance fees, customer rating, discount rate.

5. A method as in claim 1, wherein said anticipated recurring fees are selected from the group consisting of: periodic fees, monthly generation for said group of customers, anticipated cost of each unit of generation, actual cost of each unit of generation, anticipated ongoing period fee receipts, actual ongoing periodic fee receipts, collection costs, value of said on premises renewable power systems, amortization period, guarantees, installation costs, miscellaneous costs.

6. A method as in claim 1, wherein said contractual relationship between said customer and said third party is selected from the group consisting of lease, purchase, leaseback and maintenance agreement.

7. A method as in claim 1, further comprising the step of: assigning at least one guarantee to said group of customers.

8. A method as in claim 1, wherein said customer is billed by said third party according to energy usage.

9. A method as in claim 1, wherein said customer is billed according to a predetermined monthly payment and is allotted usage according to said predetermined monthly payment.

10. A method as in claim 1, further comprising the step of: providing at least one renewable power system at the premises of at least one of said customers.

11. A method as in claim 1, further comprising the step of: determining an appropriate system for each said customer.

12. A method as in claim 1, further comprising the step of: determining the revenue stream from said group of customers.

13. A computer implemented method of securitizing at least one on premises renewable power systems, said method comprising:

providing at least two customers to provide a group of customers wherein each of said at least two customers has an on premises renewable power system in communication with a central processing unit and said on premises renewable power system has associated on premises renewable power system characteristics and each said customer has at least one customer variables and said customer is billed by a third party according to energy usage;

providing a contractual relationship between each said customer and said third party, wherein said third party owns said on premises renewable power system;

rating each said customer according to said at least one customer variables to provide a customer rating;

determining dependability of anticipated revenue for each said at least one customer according to said customer rating;

determining fee assessment variables of said group of customers according to said on premises renewable power system characteristics and said customer variables;

determining anticipated recurring fees by said central processing unit for said group of customers according to said on premises renewable power system characteristics and said customer variables;

determining the anticipated monthly cash flow by said central processing unit of said group of customers according to said anticipated recurring fees and said fee assessment variables and said dependability of anticipated revenue for each said at least one customer; and securitizing said on premises renewable power system according to said anticipated monthly cash flow and said customer variables.

14. A method as in claim 13, wherein said customer variables are selected from the group consisting of annual income, credit rating, years in current job, net worth, power usage, length in home, number of moves during a predetermined time period, likelihood of moving and worthiness rating.

15. A method as in claim 13, wherein said fee assessment variables are selected from the group consisting of: power system characteristics, aggregate cost, break even point, number of on premises renewable power systems, anticipated core usage, actual core usage, anticipated recurring fees, actual recurring fees, labor fees, financing fees, processing fees, minimum fees, maximum fees, maintenance fees, insurance fees, customer rating, discount rate.

16. A method as in claim 13, wherein said anticipated recurring fees are selected from the group consisting of: periodic fees, monthly generation for said group of customers, anticipated cost of each unit of generation, actual cost of each unit of generation, anticipated ongoing period fee receipts, actual ongoing periodic fee receipts, collection costs, value of said on premises renewable power systems, amortization period, guarantees, installation costs, miscellaneous costs.

17. A method as in claim 13, wherein said contractual relationship between said customer and said financial institution is selected from the group consisting of lease, purchase, lease-back and maintenance agreement.

18. A method as in claim 13, further comprising the step of: assigning at least one guarantee to said group of customers.

19. A method as in claim 13, wherein said customer is billed according to a predetermined monthly payment and is allotted usage according to said predetermined monthly payment.

20. A method as in claim 13, further comprising the step of: providing at least one renewable power system at the premises of at least one of said customers.

21. A method as in claim 13, further comprising the step of: determining an appropriate system for each said customer.

22. A method as in claim 1, further comprising the step of: determining the revenue stream from said group of customers.

* * * * *